May 3, 1949.　　　　　　　B. W. FRY　　　　　　2,468,819
ARTICLE DISPENSING APPARATUS
Filed April 25, 1947　　　　　　　　　　　　　　5 Sheets-Sheet 1
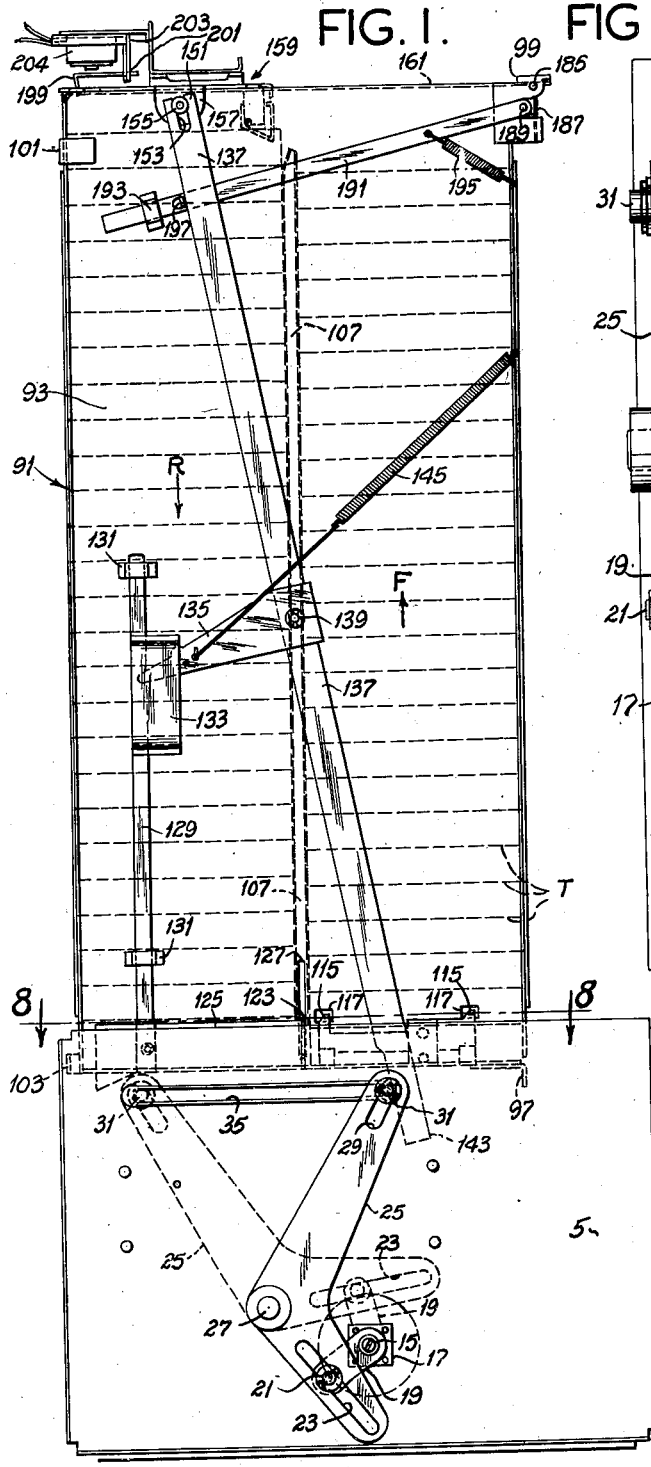
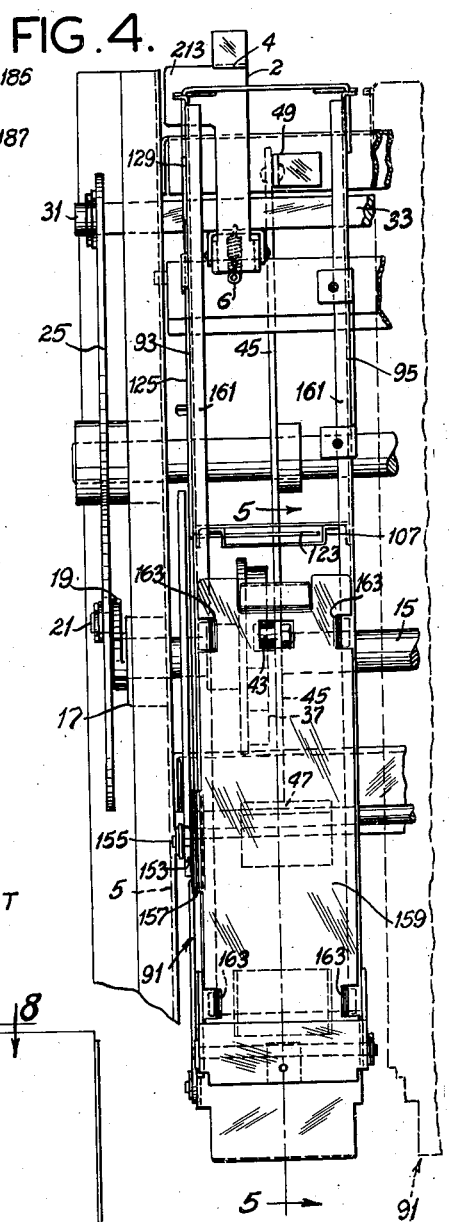

May 3, 1949.　　　　　B. W. FRY　　　　2,468,819
ARTICLE DISPENSING APPARATUS
Filed April 25, 1947　　　　　　　　　　5 Sheets-Sheet 2

Benjamin W. Fry,
Inventor.
Haynes and Koenig
Attorneys.

May 3, 1949.  B. W. FRY  2,468,819
ARTICLE DISPENSING APPARATUS
Filed April 25, 1947  5 Sheets-Sheet 4

Benjamin W. Fry,
Inventor.
Haynes and Koenig,
Attorneys.

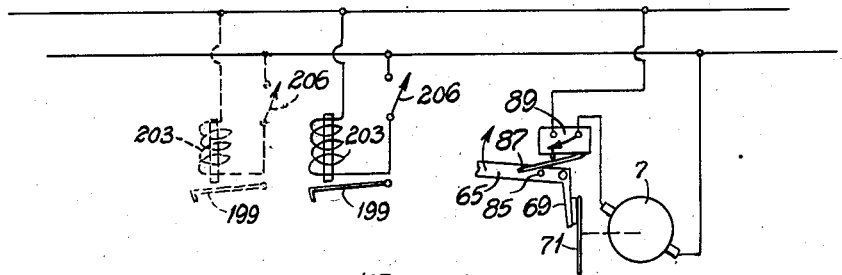
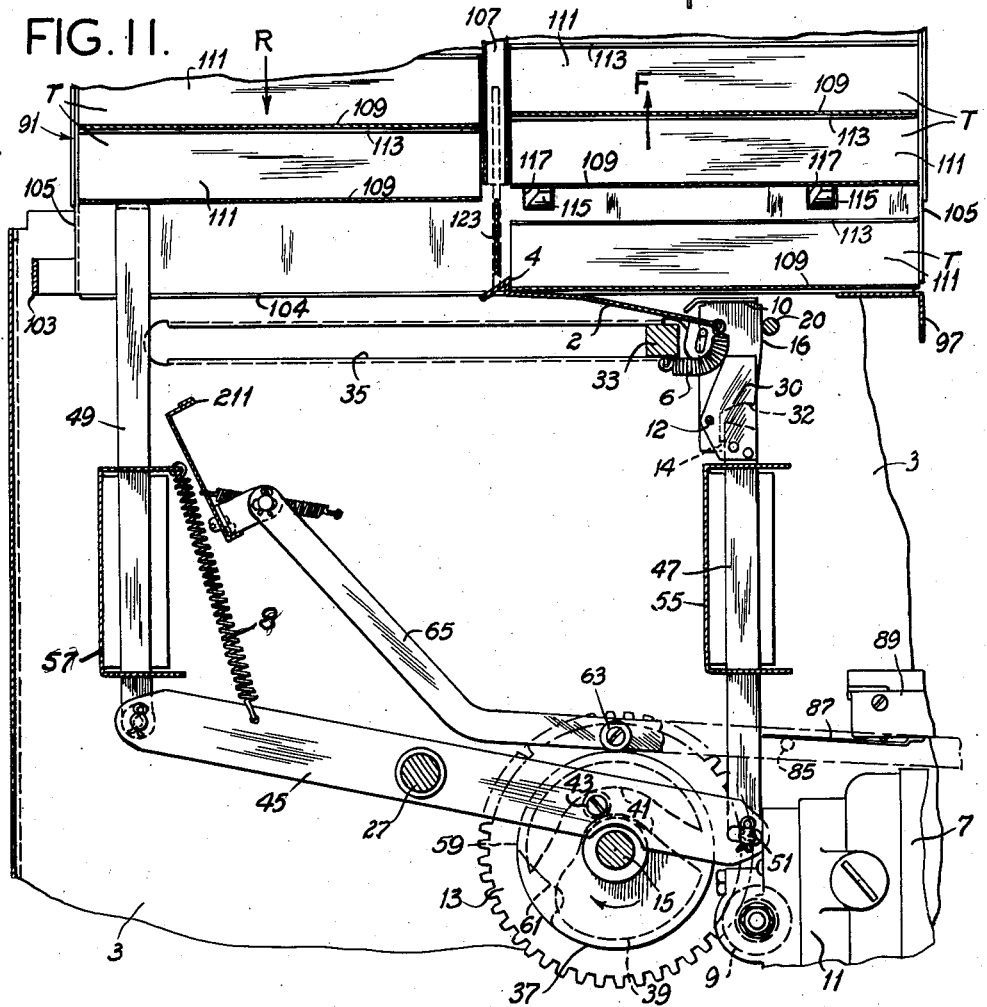

Patented May 3, 1949

2,468,819

UNITED STATES PATENT OFFICE 2,468,819

ARTICLE DISPENSING APPARATUS

Benjamin W. Fry, Ladue, Mo., assignor to National Vendors, Inc., St. Louis, Mo., a corporation of Missouri Application April 25, 1947, Serial No. 743,829

17 Claims. (Cl. 312—67)

1

This invention relates to article dispensing apparatus for delivering articles from a supply to a convenient delivery point in response to a manual operation.

Among the several objects of the invention may be noted the provision of a dispenser which will accept and deliver both regularly and irregularly shaped articles; the provision of such a dispenser having a structure readily adaptable to various types of storage units such as confectionery vending machines, refrigerators and the like; the provision of a dispenser of the class described which may readily be loaded or unloaded with various sizes and characters of articles; the provision of a dispenser of the class described in which the contained articles are compactly arranged in columns but which are independent of deforming pressures from other articles; the provision of a dispenser of this class in which there are compact magazine storage arrangements for article trays which may readily be reloaded whether all or only some of them are empty; the provision of a dispenser of this class in which the storage magazines are low but from which the articles are displayed and dispensed at a convenient, elevated location; and the provision of a dispenser of this class which is economical to construct and maintain. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a side elevation of the dispenser on a reduced scale, a bell crank of a lower drive mechanism being shown by dotted lines in an initial position and by solid lines in a subsequent position, the latter corresponding to an initial position of an upper ejecting lever shown in solid lines;

Fig. 4 is a plan view of Fig. 2, at double the scale of Fig. 2 and rotated clockwise 90°;

Fig. 11 is a fragmentary view similar to the lower end of Fig. 2 but showing alternate positions of parts; and, Fig. 12 is a wiring diagram.

Similar reference characters indicate corresponding parts throughout the several views of the drawings.

In many dispensers, in order to save head room it is advantageous to have the supply of stored articles to be dispensed located as low as possible and to make dispensing deliveries from the top of the supply. This is true, for example, in the cases of confection vending machines, deep freeze refrigerators and the like. Furthermore, in apparatus of these types the contained articles to be dispensed are of a wide variety of shapes and characteristics and are often fragile, to the extent that they should not be stacked directly one on the other. For example, in confection vending machines there may be candy bars, delicate cakes, bags of nuts and the like. In deep freeze units there may be fruits, vegetables, eggs, meats, etc. Furthermore, if such articles were stacked directly upon one another, it would be difficult to arrange a machine to make proper withdrawals of the articles from the stacks. Nevertheless, a stack-like arrangement is desirable for compactness of storage space. The present apparatus provides the conditions for successive deliveries to an elevated point from a lower supply point of such articles.

In the following ordinary auxiliary items such as containing cabinets, coin-controlled apparatus, display windows and the like (if used) have not been shown, since they are not required for an understanding of the invention and their absence aids conciseness.

Figure 2:
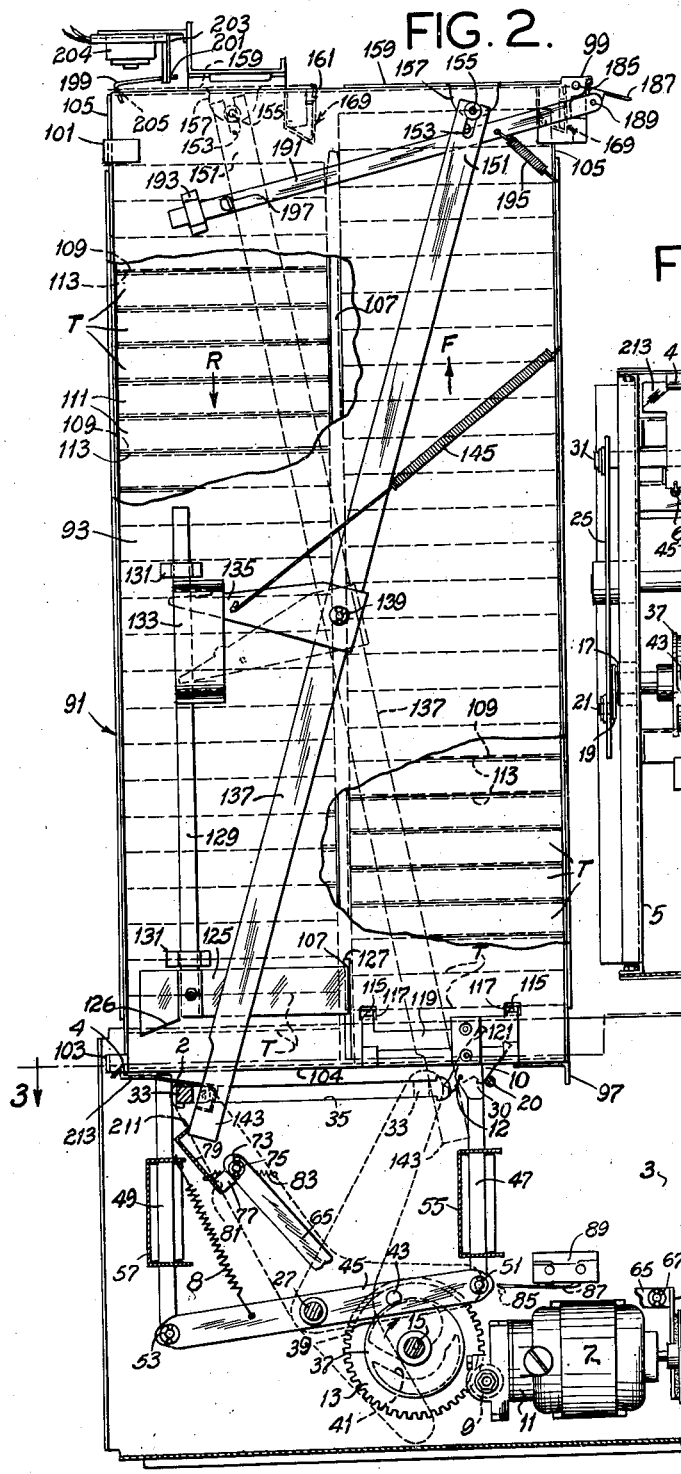
Fig. 2 is a view similar to Fig. 1 showing said ejecting lever by solid lines in delivery position and by dotted lines in said initial position (parts broken away to show certain interior constructions), the lower drive mechanism portion being entirely opened on line 2—2 of Fig. 3.
Figure 3:
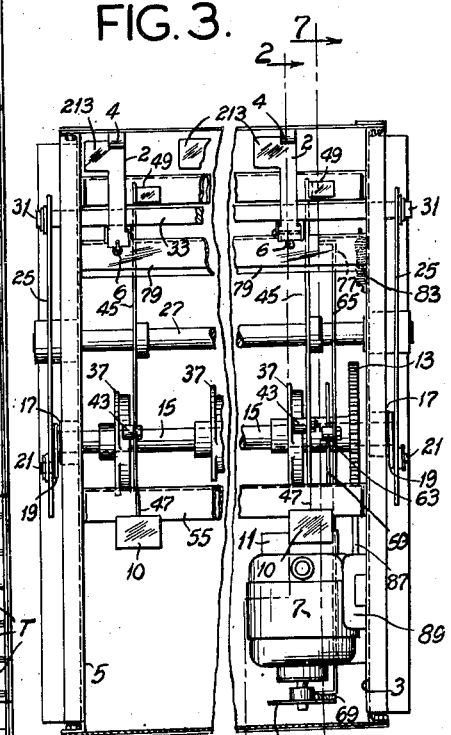
Fig. 3 is a horizontal section taken on line 3—3 of Fig. 2 with magazines removed, a number of duplicate sections being omitted.

Referring now more particularly to Figs. 1 and 2, there is shown at numeral 1 a base having end walls 3 and 5 (see also Fig. 3). Carried on the end wall 3 is a motor 7 which drives a pinion 9 through a speed reduction box 11. The pinion 9 meshes with a gear 13 located on a cam shaft 15, the latter being supported in suitable bearings 17 in the walls 3 and 5. The cam shaft 15 extends through these bearings and on its outer ends is provided with cranks 19 adapted to be turned by the shaft. Each crank carries a pin 21 acting in a slot 23 of an oscillating bell crank lever 25. There is one bell crank lever 25 on each side of the machine pivoted on a rocker shaft 27. The latter passes through the base 1 between the walls 3 and 5 and is parallel to the cam shaft 15. Each bell crank lever 25 is slotted at its upper end, as shown at 29, where it engages an end gudgeon 31 of a pusher bar 33. The pusher bar extends through slots 35 in the walls 3 and 5. Upon operation of the motor 7, the pusher bar 33 can be reciprocated transversely of its length and back and forth along the slots 35. One reciprocation of the bar back and forth in the slots occurs for each rotation of the cranks 19. In Fig. 1, the dotted position of a crank 19 and lever 25 illustrates an initial position of the parts which carry the pusher bar 33 to an initial retracted position. This retracted position of the pusher bar 33 is also shown in Fig. 2. The solid-line position of the bell crank 25 in Fig. 1 is an intermediate position in which the pusher bar is forward, as shown in Fig. 11.

Pivoted on the front of the pusher bar 33 are slippers 2 having rear catches 4 and ears 213 (Figs. 2, 4, 9 and 11). Springs 6 normally bias the slippers to lift the catches and ears. There is one slipper and one catch for each magazine to be mentioned.

On the cam shaft 15 are several identical cams 37 which rotate with the shaft 15 in identical phases. Each cam 37 has a lifting toe portion 39 and a grooved heel portion 41 providing for a positive-motion drop. There are as many of the cams 37 as there are magazines.

Figure 10:
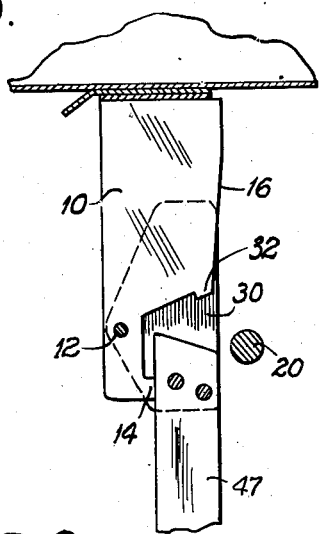
Fig. 10 is a sectional detail view of an elevator shoe in elevated position and supporting a stack of trays.
Figure 9:
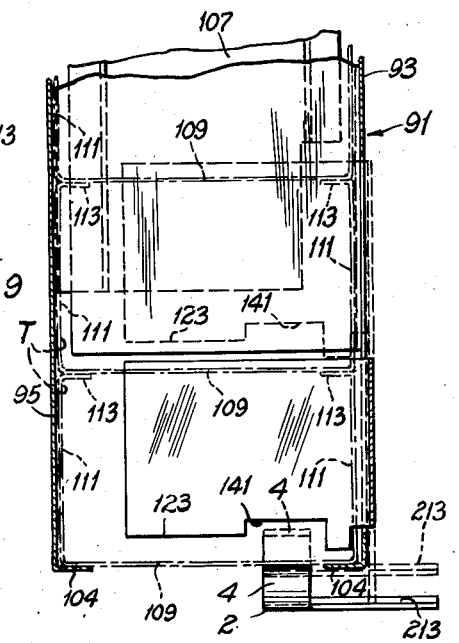
Fig. 9 is a vertical section taken on line 9—9 of Fig. 8, trays being shown in dot-and-dash lines.

Each cam 37 engages a roller follower 43 located on a rocker 45. There are as many rockers as there are cams and magazines. All of the rockers 45 oscillate in phase upon the rocker shaft 27. The function of each rocker 45 is to control certain forward and rearward elevator rods 47 and 49, respectively. There are as many rods 47 and 49, respectively, as there are magazines and cams. Each forward bar 47 is pivoted to its rocker 45 at a pivot 51. These bars 47 are guided by means of openings in a fixed channel 55 supported between the walls 3 and 5. At upper bifurcated ends 30 of the bars 47 are pivoted shoes 10 (see Fig. 10). The pivots are shown at 12. Stops 14 limit the counterclockwise rotation of these shoes to a vertical position on the elevators 47 (Figs. 10 and 11), but when not held in a vertical position these shoes may tilt clockwise under gravity, as shown by dotted lines in Fig. 2. Stops 32 limit the tilted positions. The shoes are forced to vertical positions when the elevator bars 47 are down. This is because of contact of edges 16 of the shoes with a stationary guide bar 20 extending between the walls 3 and 5. When the elevators 47 are up, gravity may, in the absence of a tray (to be described), bias the shoes 10 clockwise (Fig. 2), their clockwise limit being determined by said stop 32 after the edges 16 leave the bar 20. In the presence of a tray, a shoe 10 will not tilt even though lifted (see Fig. 10).

The rearward bars 49 are respectively pivoted to the rockers 45 at 53. These bars 49 are guided in a second fixed channel 57 supported between the walls 3 and 5. Each rocker is biased clockwise (Fig. 2) by means of a tension spring 8 reacting from the channel 57.

When the toe portions 39 of the cams 37 engage the followers 43, all of the forward elevator bars 47 rise at once and the rearward elevator bars 49 descend at once. When the grooved, positive-motion toe parts 41 of the cams 37 engage the followers 43, the forward elevator bars 47 descend and the rearward elevator bars 49 lift.

Figure 7:
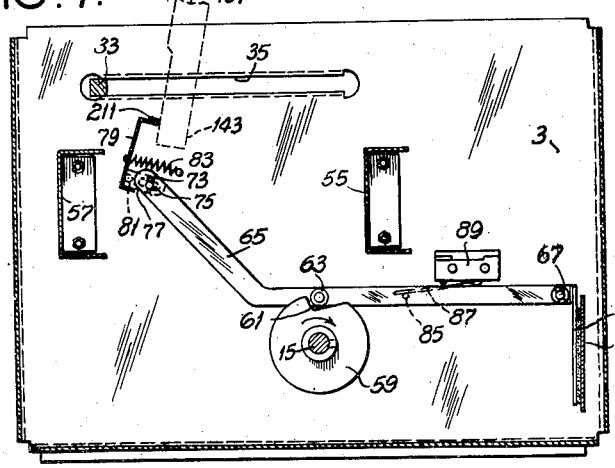
Fig. 7 is a vertical section taken on line 7—7 of Fig. 3 and to the same scale and showing a starting position.

At one end of the cam shaft 15 near wall 3 is a master cam 59 (Fig. 7). This cam has a single notch 61. The cam is engaged by a follower 63 located upon a combined brake and switch bar 65, which is pivoted to the wall 3 at 67. When the bar 65 rotates counterclockwise, the brake arm 69 of this bar will be applied against a brake disc 71 on the shaft of motor 7. The bar normally rotates in this direction under gravity. It may thus move under gravity only when the notch 61 admits the follower 63. When the follower 63 rests on the cam 59 (other than in the notch 61), the brake is off. At this time, or whenever the bar 65 is lifted (moved clockwise), a pin 85 engages the control arm 87 of a motor switch 89. This action closes the switch to energize the motor. When the bar drops, the switch opens to deenergize the motor and the motor brake is applied (Fig. 7).

The extreme left end of the bar 65 is slotted, as shown at 73, to admit a gudgeon 75 on ear 77 which is affixed to a channel-shaped control bar 79. The bar 79 is pivoted at its opposite ends to the walls 3 and 5, as indicated at the pivots 81. The control bar 79 is normally biased clockwise by means of a tension spring 83. When it is pushed counterclockwise, the gudgeon 75 in slot 73 lifts the arm 65 to lift the follower 63 from the notch 61. This releases the motor brake and closes the motor switch.

Since the motor drives the cam shaft 15, the master cam 59 will start to turn, and after once being started, the notch 61 moves from under the follower 63 so that even if thereafter the control bar 79 is released it is held up by the cam 59, and the motor continues to run until a complete revolution has been made of the master cam 59. After complete revolution, the follower 63 again falls into the notch 61 to open the motor switch 89 and set the brake 69 for a quick stop. Thus it will be clear that it requires only a temporary counterclockwise movement of the control bar 79 to start the motor, resulting in one complete revolution of the cam shaft 15. The means for temporarily moving the control bar 79 will be described below. One revolution of the cam shaft 15 oscillates the bell cranks 25 once from the dotted position in Fig. 1 to the solid-line position and back to the dotted position. This also oscillates the rockers 45 up and down once. The single oscillation of the bell cranks 25 moves the bar 33 (carrying the slippers 2) forward and back (compare Figs. 1, 2 and 7 with Fig. 11). This one revolution also causes the elevators 47 to descend while elevators 49 rise (Fig. 11), the elevators 47 then again ascending and the elevators 49 again descending (Fig. 2).

The self-returning parts so far described in the base 1 are the parts for returning to starting position the mechanism to be described in connection with the magazines on the base. These magazines have already been alluded to and will now be described in detail. The number of magazines to be used is limited only by the width of the lower section 1 upon which they are mounted. There is one magazine for each organization of a cam 37, rocker 45, slipper 2, elevators 47, 49, and associated parts. The width of the lower section 1 is of course made enough to accommodate the number of operating units desired, and in Fig. 3 this lower section has been broken away to indicate this fact. Since each magazine to be described is the same as each other magazine, only one magazine will be described in detail, although as shown in Fig. 4, one additional magazine of the several that may be used is indicated by the broken, dotted lines. In Fig. 4 the magazine shown in full lines is the last one to the left on the base 1.

Each magazine is indicated in general by the numeral 91. It consists of sides 93 and 95, spaced apart by means of straps 97, 99, 101 and 103 near its corners. These are of limited extent so that the front, back, top and bottom of each magazine are essentially open except for edgewise guide flanges 105 at the front and back, bottom flanges 104 and top flanges 161. A central dividing wall or guide 107 separates into two spaces the front and back portions of the magazine. Between the wall 107 and the front guide flanges 105 are elongate trays or holders T. Each tray T has a solid bottom 109, solid side walls 111, with an inwardly turned flange 113 at the top of each side wall. The front and back ends of these trays are open. The flanges 113 permit stacking of them, the bottom 109 of each tray being capable of resting upon the flanges 113 of a tray under it. There are two columns of trays in each magazine, one column ahead of the wall 107 and one behind it. The planes of the lengths of the trays in the columns are coextensive. The dimensions of the trays are such as to receive the articles which it is expected to deliver from the machine, confections such as candy bars in the present example.

The lowermost tray in the front column F rests upon four lugs 115 extending through openings 117 in the side walls 93 and 95. The pair of lugs 115 extending through each wall are on a common member 119 supported on a leaf spring 121 affixed at its lower end to the outside bottom portion of the magazine. Thus the lugs 115 may be pushed outward through the openings 117. Each lug 115 slopes upward. The upward slope is to permit of feeding a tray up from the space arranged beneath the lugs to rest upon their upper surfaces (Fig. 11). As a tray rises, its sides 111 spring the lugs laterally, springs 121 permitting this, and as the bottom of the tray rises above the lugs, the lugs spring inward to support the tray, leaving an open space beneath column F. The elevations of the lugs above the bottom of the magazine are such that the space provided below the tray supported on the lugs will admit of the advance of a tray from the bottom of the rear column R into this space. This advance is effected by the operation of the latch 4 on the respective slipper 2 if the latter is properly conditioned, as will be described. The wall 107 falls short of the magazine bottom by an amount to permit this advance.

To prevent a tray from accidentally advancing from the bottom of the rearward column R to the bottom of the forward column F when not desired (as during loading or the like), a vertically sliding gate 123 is arranged at the bottom of the wall 107. This gate is a bent-in part of a slide 125 on the outside of the wall 107. The gate extends in through the wall through a slot 127. The slide 125 includes a bar 129 supported in guides 131. This bar 129 includes a pocket piece 133 with which engages the end of a lug 135 of a lever 137, pivoted at 139. The pivot 139 is on the wall 107. As the slide 125 is moved up and down on the side of the magazine by oscillation of lever 137, the gate 123 moves up and down to form a movable extension of the lower end of the wall 107 to pass a tray or block it in its motion from the bottom of the column R to the bottom of the column F. The gate 123 is cut out, as shown at 141, to permit the passage of one of the catches 4 when hooked in behind a tray to be transferred under the gate from column R to column F.

The lever 137 has a lower finger 143 swinging at the side and below the lower end of the magazine. It swings from an initial forward position (Fig. 1) to a temporary rearward releasing position engaging the control bar 79 (Figs. 7 and 2). A spring 145 biases the lever 137 from its normal dotted-line position shown in Fig. 2 (wherein it is latched by means to be described) toward the releasing position shown in solid lines in Fig. 2. Therefore when released, the lever 137 moves as stated. When the finger 143 swings back (solid lines, Fig. 2), the control bar 79 is engaged and rotated counterclockwise (Fig. 2) to lift the brake and switch bar 65 so as to release the brake 69, 71, close the motor switch 89 and start the motor for one cycle of operation of the cam shaft 15.

The upper end of the bar 137 is slotted, as indicated at 153, for articulation with a gudgeon 155 carried on an ear 157 of a reciprocating flat slider 159 riding along the top of the magazine walls 93 and 95, said walls being provided with the stated inwardly turned flanges 161. Small ears 163 on the slider 159 extend under the flanges 161 for guide purposes.

Figure 5:
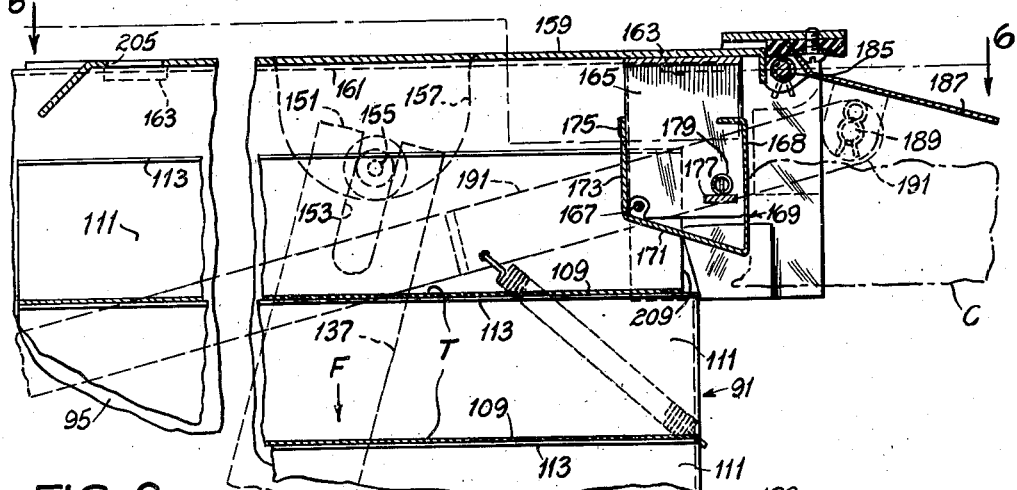
Fig. 5 is a fragmentary longitudinal section taken on line 5—5 of Fig. 4 but at twice the scale of Fig. 4.
Figure 6:
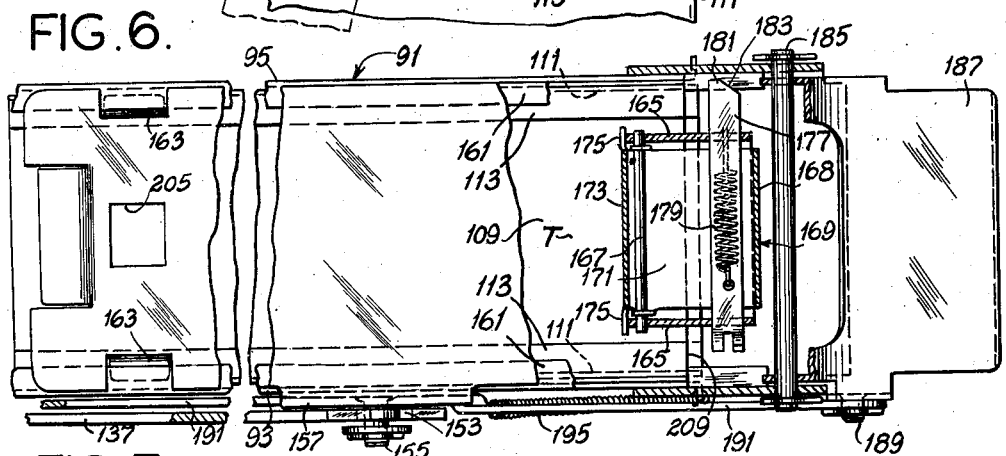
Fig. 6 is a detail plan view of Fig. 5, partly in section, being taken on line 6—6 of Fig. 5.

On the front and bottom of the slider 159 are turned-down ears 165, carrying a pivot 167 for a pivoted pusher 169. The bottom 171 of this pusher slopes up to the rear and the back 173 has extensions 175 engaging the ears 165 to limit the clockwise gravity movement of the pusher (Figs. 5 and 6). The pusher front 168 is for the purpose of pushing an article from the uppermost tray of the front column F.

Sliding crosswise in openings in the ears 165 is a laterally sliding latch 177 which, by means of a spring 179, is biased outward from the slide. A nose 181 of the latch slides along the inside of the side wall 111 of any tray that is in its uppermost position in the forward column F. This nose can also move out against the side wall 95 of the magazine, which it does when it passes the front edge of such a tray. The significance of this will appear. The front of the nose is beveled, as shown at 183, to facilitate entry of the nose over the rear edge of the tray when the pusher enters it from the back in the manner to be described.

At the upper front of the magazine is a pivot 185 for a swinging gate 187. Pivoted to one side of the gate at 189 is a slide bar 191 which reaches rearward into a guide 193 on the side 93 of the magazine. The bar 191 is biased forward by means of a spring 195. This tends to open the gate 187, as shown in Figs. 5 and 6. In order to close the gate, there is provided on the bar 191 a lug 197, adapted to be engaged by the upper end of the lever 137 when this lever is in its Fig. 1 position.

The upper end of the wall 107 is short enough to permit transfer of the uppermost tray in the front column F to the upper end of the rear column R after said tray has been emptied.

The positions of the lever 137 and slide 159, such as shown in Fig. 1, are maintained in each magazine by means of a gravity returned magnetic latch 199 pivoted at 201 on a bracket 203 for a solenoid 204 carried at the upper end of the magazine 91. The latch 199 cooperates with an opening 205 formed in the top rear end of the slide 159. A switch 206 controls each solenoid 204. There is one switch 206 for each magazine (Fig. 12).

Operation is as follows, starting with the lever 137 and the slide 159 in the dotted initial, latched position of Fig. 2. At this time the bell cranks 25 are in the dotted-line position of Fig. 1. The operator closes the respective switch 206 (Fig. 12), which may be directly manually closed or coin-operated, if desired. This energizes the respective solenoid 204 to lift the latch 199. This clears the slide 159 for forward movement under clockwise driving action of lever 137 which is so biased by the spring 145. The final positions of the lever 137 and slide 159 are shown in full lines in Fig. 2 (see also Figs. 5 and 6). In Fig. 5 the upper end of lever 137 is dotted because it is in front of the plane of the section. It is assumed that at this time all trays T are filled and that there is a loaded tray at the upper end of the front column F ahead of the forwardly moving pusher 169 (Fig. 2). It is also assumed that at this time there is no tray at the upper end of the rearward column (Fig. 2). It is also assumed that there is a lowermost tray in the rearward column (Fig. 2), resting upon inwardly turned bottom flanges of the magazine. Lastly, it is assumed that there is no tray in the space at the bottom of the front column F beneath the lugs 115 (Fig. 2).

As the released slide 159 moves forward, contents C of the uppermost tray are ejected (solid lines Figs. 2, 5 and 6). The contents may, for example, be a candy bar as illustrated by broken lines in Fig. 5. The ejected article falls into a suitable chute (not shown) in the surrounding cabinet structure (also not shown). As ejection occurs, the gate 187 swings open, since the upper end 151 of the lever 137 clears the lug 197 to allow spring 195 to bias the bar 191 forward, thus pushing open said gate 187. Incidentally, in its closed position the gate 187 prevents unauthorized removal of an article from the upper tray by tilting the device.

As the slide 159 moves forward, the nose 181 of the latch 179 cams past the rear edge of the tray by reason of the bevel 183. The nose 181 rides forward on the inner wall of the tray until it leaves the front edge 209 of the tray, as illustrated in Fig. 6. Hence, when the slide 159 returns to the solid-line position shown in Fig. 1, it will take with it (by means of the latch 177) the uppermost empty tray over the upper end of the wall 107, and deposit it in the empty space at the top of the rear column R.

While the above operations are occurring at the upper end of the magazine, the following operations occur at the lower end, starting with the dotted-line position of the bell cranks 25 (Fig. 1). As the slide 159 moves forward under forward action of the upper end of the lever 137, the finger 143 at the lower end of said lever moves backward through the position shown in Fig. 7 to the position shown in full lines in Fig. 2. Thus it engages the upper lip 211 of the control bar 79. This lip at this time is forward because of the biasing action of the spring 83 on the control bar. When contacted by the finger 143, the control bar 79 rotates counterclockwise (Fig. 2), thus lifting the brake and switch bar 65 and the cam follower 63. This releases the brake bar 69 from the brake disc 71, making the now energized motor 7 free to move. It will be recalled that the motor is energized by reason of closure of switch 89 by the pin 85 on the bar 65. Thus the motor turns the cam shaft 15 the one turn already described. It is to be noted that prior to this event the cam shaft 15 was in its normal starting position (Fig. 7), wherein the notch 61 accommodated the depressed follower 63. In this position of the cam shaft the brake 67, 69 was set and the switch 89 was open. Furthermore, in this position of the cam shaft, the multiple cams 37 were set with the followers 43 on the lift portions 39 of these cams, thus setting the rockers 45 to lift all of the front elevators 47 and to depress all of the rear elevators 49 (Fig. 2).

However, as soon as the control bar 79 is engaged (Fig. 2) by the rearwardly moved finger 143, the follower 63 is lifted and the motor started, as already described. The cam shaft then turns clockwise, as viewed in Figs. 1, 2 and 7. This takes the notch 61 from under the follower 63 so that the bar 65 cannot thereafter drop until a full revolution has been accomplished of the cam shaft, the motor circuit remaining closed and the brake released.

Figure 8:
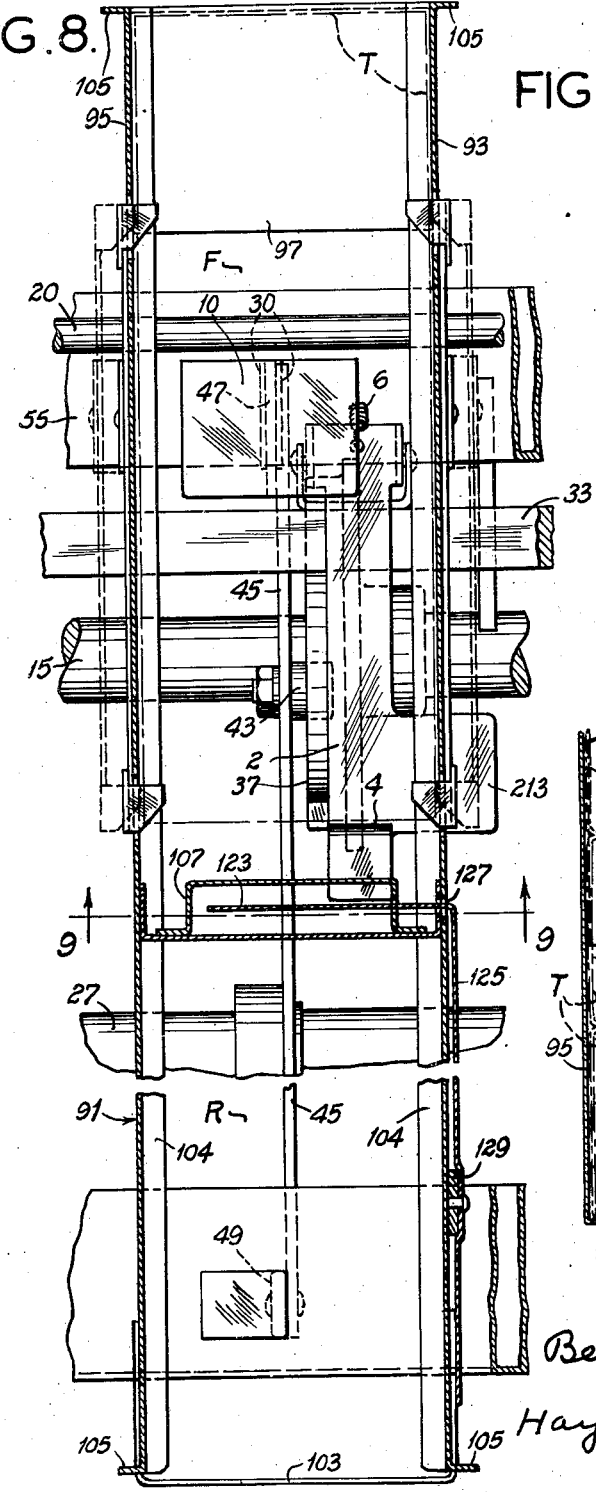
Fig. 8 is an enlarged horizontal section taken on line 8—8 of Fig. 1 but showing a certain tray in dot-and-dash lines.

As the full revolution of the cam shaft 15 starts, the slippers 2 are all driven forward. It will be remembered that the slippers 2 are on the bar 33, which is at this time pushed forward by means of the action of cranks 19 and the bell cranks 25 (see Fig. 1, for example). However, since only the slipper under the now lifted side plate cam 126 of the magazine under operation has been permitted to lift (Fig. 2), only the ear 213 of the associated slipper 2 is permitted to rise. The lifting action on cam 126 is effected by the lug 135 on lever 137 as the latter swings clockwise (Fig. 2). Only the catch 4 of that released slipper connects in behind the rear edge of the lowermost tray in the rear column R of the magazine being worked. Only this tray is pushed forward into the open space under the lugs 115 (Figs. 8 and 11). All other slippers in other magazines not operated remain depressed by their respective cams 126. Hence as the other slippers 2 advance, their catches 4 will slide inoperatively under the lowermost trays of all other magazines not being worked.

It will also be recalled that as the lever 137 swings clockwise (dotted-line to solid-line position, Fig. 2), the lug 135 has also raised the gate 123 through the mechanism 133, 129, 125. Thus the operative forwardly moving tray at the bottom of the columns is unimpeded in the magazine under operation.

As the cams 37 rotate during the above-described advance, the followers 43 are caught in the heel groove 41 of these cams, being thereby pulled down to rock the rocker arms 45 clockwise, as shown in Fig. 11. The timing is such that the respective rear elevator 49 starts to rise behind the forwardly moving rear portion of the tray being transferred at the bottom of the magazine, so as to engage the second lowest tray as the withdrawn tray moves forward. This supports the column R in the absence of this withdrawn tray. It may be observed at this point that as to the other elevators in other magazines, these come up against a lowermost tray in the respective rear columns because such trays are not removed. The result is a temporary lifting up of the entire rear column and the subsequent letting down of this column in the inoperative magazines. Such action is provided for by the fact that the uppermost tray in the rear column is never up against the upper flanges 161, but there is space enough provided to allow for this rise and fall of this rearward column in each magazine from which no delivery is being made.

The timing is also such that as the forward elevators 47 descend, they admit any forwardly moving tray such as the one in the magazine under operation. Thus the forwardly moving lowermost tray in the magazine in operation is admitted to the space provided beneath the lugs 115 (Figs. 8 and 11).

As motion proceeds, the forwardly moving latch bar 33 resets the finger 143 forward, thus rotating the lever 137 counterclockwise to the solid-line position (Fig. 1) so as to reset the solenoid latch 199 for the next delivery.

Then, as crank 19 continues to rotate, the latch bar 33 recedes in the slots 35, leaving the finger 143 behind (dotted-line position of finger 143 in Fig. 2). At the same time, the rear elevators descend. The rear elevator in the magazine under operation gently lets down the rear column R from the Fig. 11 position to the Fig. 2 position so that the bottommost tray moves into the space left by the withdrawn tray, the column finally resting upon the bottom flanges of the magazine.

At this time all of the forward elevators rise, but only the shoe 10 associated with the elevator in the magazine under operation remains vertical (Fig. 10), since its pad-like top contacts the flat bottom of the tray in the space below the lugs 115 (Fig. 11) to lift this tray to a position above the lugs and thus to lift the entire front column F so that another uppermost loaded tray comes into position ahead of the pusher 169 ready for repetition of the cycle. As to the shoes 10 in magazines that are not under operation, these contact no tray in the space beneath the lugs 115, and therefore tilt forward by gravity as their front edges 116 recede from the bar 20, as illustrated in Fig. 2. This is to prevent these other shoes from contacting the bottommost trays resting upon the lugs 115 in the inoperative magazines.

After the cam shaft 15 has progressed through one revolution, bringing about the above-described delivery and resetting, the cam follower 63 will drop into the notch 61. This opens the motor circuit switch 89, shutting off the motor and applying the brake 67, 69, 71. The purpose of the brake is to prevent coasting of the motor and other parts of the machine beyond their initial positions.

It will be observed that any one or more of the magazines may be operated selectively in the manner above described, by controlling the respective switches 205. It should be understood as to Fig. 9 that there is only one motor, motor switch and brake, but there are as many solenoids 203 and latches 199 as there are magazines, and this fact is suggested by additional dotted lines for one additional solenoid and latch (Fig. 12). It will be understood that instead of having a switch 206 and a solenoid relay 203 for each magazine, the respective latch 199 may be manually operated, either by hand, foot or the like.

From the above it will be seen that each cycle of operation of a given magazine results in discharge from the uppermost tray in the front column F; then withdrawal of this tray from the top of the front column F to the top of the rear column R; and a transfer of a tray from the bottom of the rear column R to the space under the front column F with a subsequent lifting of this last-mentioned tray onto the lugs 115 with a consequent lifting of the entire front column F to present another loaded tray at the top of the front column F. As successive operating cycles occur in connection with a given magazine, its trays gradually circulate from the top to the bottom of the rear column R, thence into the bottom of the front column F and up through the front column F for final return to the top of the rear column R. Furthermore, just before they are transferred from the top of the front column F to the top of the rear column R, they are relieved of their contents. Ultimately all of the trays may be emptied. When some or all of them are emptied, they may be reloaded from time to time by introducing objects into their open ends exposed at the open sides of the magazine.

An advantage of the construction is that the trays are separate and not linked by any concatenating means requiring expensive assembly operations. Damaged or dirty trays may easily be removed and replaced. A further advantage is that each article to be dispensed may be seen from the top by the prospective purchaser, since the uppermost tray in the column F is open. Thus the machine presents to full advantage any attractive labeling that is often applied to be viewed from the top on candy bars and the like. This of course requires a casing (not shown in the present application) which has suitable transparent openings above the battery of magazines, as may be seen from the showing in a design patent application of Walter E. Moore, Serial No. D. 135,070, filed November 25, 1946, eventuated as Patent D. 151,063, which shows a casing designed for the present machine.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a dispenser, a magazine for maintaining a first and a second column of trays, each tray having a bottom, open ends and an open top, the bottom of each tray being slidable on the top of the one beneath it, a reciprocating member movable over the columns along the trays therein, said reciprocating member being normally positioned over the first column and biased to a discharge movement over the second column, the reciprocating member including a pusher movable through the open ends of the uppermost tray in the second column to push an article from its one end and also including a releasable latch engageable with a part of the tray thus emptied to retract it from the top of the second column to the top of the first column, and automatic means released by discharge movement of the reciprocating member adapted to move through a predetermined cycle to return the reciprocating member to its initial position and to move a bottommost tray from the first column into position beneath the second column and to lift the second column to replace with another tray the tray retracted from its upper end.

2. In a dispenser, a magazine for maintaining a first and a second column of elongate trays the planes of the lengths of which are coextensive, each tray having a bottom, open ends and an open top, the bottom of each tray being slidable on the top of the one beneath it, a reciprocating member movable over the columns along the lengths of the trays therein, said reciprocating member being normally positioned over the first column and biased to discharge movement over the second column, the reciprocating member including a pusher movable through the uppermost tray in the second column to push an article from its one end and also including a releasable latch engageable with a part of the tray thus emptied to retract it from the top of the second column to the top of the first column, and automatic means released by discharge movement of the reciprocating member adapted to move through a predetermined cycle to return the reciprocating member to its initial position and to move a bottommost tray from the first column into position beneath the second column and to lift the second column to replace with another tray the tray retracted from its upper end, said automatic means also including means effecting gentle descent of the first column after removal of a tray from its bottom.

3. In a dispenser, a battery of magazines each comprising means for maintaining a first and a second column of trays, reciprocating means associated with each magazine, each reciprocating means being latched over the first column and biased to move over the second column to remove an article from the uppermost tray in the latter, each reciprocating means being responsive to a respective unlatching operation to move under its bias and to unload an article from the uppermost tray in the second column and upon return against its bias to transfer the unloaded tray from the top of the second column to the top of the first column, and automatic means responsive to unlatching operation in any magazine and released by discharge movement of one of the reciprocating means in an operated magazine adapted to move through a predetermined cycle to return the respectively operated reciprocating means to its initial position, said automatic means including a normally retracted catch released by operation of the respectively operated reciprocating means for engaging only the lowermost tray in the first column of the magazine under operation, to move said tray from the bottom of the first column to the bottom of the second column, said automatic means including an elevator operable to lift the second column by means of the bottommost tray introduced therein.

4. A dispenser magazine comprising spaced vertical side members, a vertical median member between said members and extending short of their upper and lower parts to provide transfer passages, first and second columns of trays respectively on opposite sides of said median member, the first column resting at the lower end of the magazine, resiliently mounted lugs supporting the lowermost tray in the second column above the lower end of the magazine and being adapted to admit a tray into said space and to permit lifting thereof into position to rest on the lugs, the normal number of trays in the first column providing space for receiving at the upper end of the first column a tray from the upper end of the second column, a reciprocating member movable across both columns and biased to move from the top of the first column to the top of the second column, latch means for holding said reciprocating member against its bias and over the first column, a pusher on said reciprocating member for pushing an object from the topmost tray in the second column upon biased movement of the reciprocating member, a latch carried by said reciprocating member adapted to retract the unloaded tray from the top of the second column into the space at the top of the first column, and means responsive to biased movement of the reciprocating member to initiate retraction thereof to its latched position and adapted to transfer a tray from the bottom of the first column into the space under the second column and to lift said tray from said space onto said lugs, whereby after said reciprocating member has been retracted the second column is lifted to position its topmost tray in the location where a tray has been retracted by the reciprocating member.

5. An article dispenser comprising means containing two columns of article trays, means for displacement of trays from the bottom of the first column to the bottom of the second column, tray transfer means for transfer of trays from the top of the second column to the top of the first column, latching means for holding said transfer means in an initial position, means adapted to bias said transfer means away from said initial position, means operative upon return of the transfer means to its initial position for transferring the uppermost tray in the second column to the top of the first column, means for releasing said latching means, driving means adapted upon starting from an initial position to pass through a single complete cycle, said driving means including a control member, a driving member, an elevator and displacement means for moving a tray from the bottom of the first column to the bottom of the second column, said transfer means being engageable with said control member during movement of the transfer means to ejecting position to initiate movement of said driving means through a complete cycle to return said transfer means to its initial latched position, said displacement means being operative to move a tray from the bottom of the first column to the bottom of the second column, and said elevator of the driving means being operative to lift the second column.

6. An article dispenser comprising a magazine, said magazine being arranged to contain two columns of article trays and for displacement of trays from the bottom of the first column to the bottom of the second column and for transfer of trays from the top of the second column to the top of the first column, upper tray transfer and article ejecting means, latching means for holding said upper tray transfer means in an initial position, means adapted to bias said upper tray transfer means away from said initial position and toward ejection of an article from the uppermost tray in the second column, means operative upon return of the upper tray transfer means to its initial position for transferring the uppermost empty tray in the second column to the top of the first column, means for releasing said latching means, driving means associated with the magazine adapted upon starting from an initial position to pass through a single complete cycle, said driving means including a control member, a driving member, an elevator and displacement means for said displacement of a tray from the bottom of the first column to the bottom of the second column, said upper tray transfer means being engageable with said control member during movement of the upper transfer means to ejecting position, whereby movement is initiated of said driving means through a complete cycle to return said upper tray transfer means to its initial latched position, said displacement means being operative to move a tray from the bottom of the first column to the bottom of the second column, said elevator of the driving means being operative to lift the second column to present another tray at its top for subsequent cyclic operation and to provide for acceptance beneath the second column of a tray displaced from the bottom of the first column.

7. An article dispenser comprising a magazine, said magazine being arranged to contain two columns of article trays and for displacement of trays from the bottom of the first column to the bottom of the second column and for transfer of trays from the top of the second column to the top of the first column, upper tray transfer and article ejecting means associated with the magazine, latching means for holding said upper tray transfer means in an initial position, means adapted to bias said upper tray transfer means away from said initial position and toward ejection of an article from the uppermost tray in the second column, means operative upon return of the upper tray transfer means to its initial position for transferring the uppermost tray in the second column to the top of the first column, means for releasing said latching means, driving means associated with the magazine adapted upon starting from an initial position to pass through a single complete cycle, said driving means including a control member, a driving member, elevators and displacement means for said displacement of a tray from the bottom of the first column to the bottom of the second column, said upper tray transfer means being engageable with said control member during movement of the upper transfer means to ejecting position, whereby movement is initiated of said driving means through a complete cycle to return said upper tray transfer means to its initial latched position, said displacement means being operative to move a tray from the bottom of the first column to the bottom of the second column, said elevators of the driving means being operative to lift the second column to present another tray at its top thereby to provide for acceptance beneath the second column of a tray displaced from the bottom of the second column and also to drop the first column to provide a space at its top for acceptance of the empty tray from the top of the second column.

8. In a dispenser, means for holding a first and a second column of trays, said columns having adjacent ends, each tray being movable laterally with respect to the trays adjacent to it, a member laterally movable near the tops of the columns normally positioned at the top of the first column and movable into position near the top of the second column, said member including means to remove an article from an uppermost tray in the second column and including means to move the tray thus emptied from the top of the second column to the top of the first column, and means coordinated with the action of said movable member first to drop the first column to provide a space at its upper end for reception of the retracted tray before said tray is retracted, then to lift the second column to replace with another tray the tray retracted from its upper end and to move the bottommost tray from the first column into position beneath the second column.

9. In a dispenser, a support for maintaining a first and a second column of trays, each tray being movable laterally with respect to the trays adjacent to it, a member movable near the tops of the columns normally positioned at the top of the first column and movable into position near the top of the second column, means on said member to eject an article from an uppermost tray in the second column, means on said member to move the tray thus emptied from the top of the second column to the top of the first column, and means coordinated with the action of said movable member first to drop the first column to provide a space at its upper end for reception of the retracted tray, then to lift the second column to replace with another tray the tray retracted from its upper end and to move the bottommost tray from the first column into position beneath the second column.

10. In a dispenser, means for maintaining a first and a second line of trays, said lines having adjacent ends, each tray being movable in the lines and laterally thereto with respect to the tray next to it, a member operative at adjacent ends of the lines of trays and movable to eject an article from an end tray in the second line and to retract the tray thus emptied into the adjacent end of the first line, and means coordinated with the action of said movable means adapted to move a tray from the other end of the first line into position at the adjacent other end of the second line, also to advance the second line to replace with another tray the tray which was retracted and to move the first line in the opposite direction to provide space for the reception of said retracted tray.

11. In a dispenser, means for maintaining a first and a second line of trays, said lines having adjacent ends, each tray being movable along the lines in opposite directions each tray being movable laterally to the lines, a member operative at adjacent ends of the lines of trays and movable to retract a tray from the end of the second line into the adjacent end of the first line, and means coordinated with the action of said movable means to push a tray from the other end of the first line of trays into position at the adjacent other end of the second line of trays, also to advance the second line of trays to replace with another tray the tray that was retracted and to move the first line of trays in the opposite direction to provide space for the reception of said retracted tray.

12. In a dispenser, means for maintaining a first and a second line of non-linked trays, said lines having adjacent ends, each tray being movable along the lines in opposite directions and laterally to the lines, a member operative at one pair of adjacent ends of the lines of trays and movable to retract a tray from the end of the second line into the adjacent end of the first line, means coordinated with the action of said movable means to move a tray from the other end of the first line of trays into position at the adjacent other end of the second line of trays, also to advance the second line of trays to replace with another tray the tray that was retracted and to move the first line of trays in the opposite direction to provide space for the reception of said retracted tray.

13. In a dispenser, means for maintaining a first and a second line of non-linked trays, said lines having adjacent ends, each tray being movable in opposite directions along the lines and laterally to the lines with respect to the tray next to it, a member operative at adjacent ends of the lines of trays and movable to retract a tray without rotation from the end of the second line into the adjacent end of the first line, means coordinated with the action of said movable means to move a tray without rotation from the other end of the first line into position at the adjacent end of the second line, also to advance the second line to replace with another tray the tray that was retracted and to move the first line in the opposite direction to provide space for the reception of said retracted tray.

14. In a dispenser, means for maintaining a first and a second line of trays, said lines having adjacent ends, each tray being movable in opposite directions along the lines and laterally to the lines with respect to the tray next to it, a member operative at adjacent ends of the lines of trays and movable to retract a tray from the end of the second line into the adjacent end of the first line, and means coordinated with the action of said movable means to push a tray from the other end of the first line into position at the adjacent end of the second line, also to advance the second line to replace with another tray the tray that was retracted and to move the first line in the opposite direction to provide space for the reception of said retracted tray, said means for maintaining the first and second lines of trays and the means for retracting and pushing trays between lines being adapted to maintain each tray always in a position parallel to all other positions that it may assume in the dispenser.

15. In a dispenser, means for maintaining a first and a second line of trays, said lines having adjacent ends, each tray being movable in opposite directions along the lines and laterally to the lines with respect to the tray next to it, a member operative at adjacent ends of the lines of trays and movable to retract a tray from the end of the second line into the adjacent end of the first line, means coordinated with the action of said movable means to push a tray from the other end of the first line into position at the adjacent end of the second line, also to advance the second line to replace with another tray the tray that was retracted and to move the first line in the opposite direction to provide space for the reception of said retracted tray, and means coordinated with said retracting and pushing means whereby an object is removable from the uppermost tray in the second line only at intervals preceding retraction of a tray from the second line to the first line.

16. In a dispenser, supporting means for maintaining adjacent lines of loaded trays, means for unloading each tray when it is at one end of one line, means adapted to retract the unloaded tray from the one line in which it is unloaded into the other line, coordinated means adapted to move said lines in opposite directions so as to replace the unloaded tray with a loaded tray in said one line, and additional coordinated means to supply another loaded tray from said other line into said one line from which the unloaded tray was retracted.

17. In a dispenser, supporting means for maintaining adjacent upright stacks of non-linked loaded trays, means for unloading trays at the upper end of one column, means adapted to retract the unloaded tray from its said position onto the top of the other column, coordinated means adapted to move the columns in opposite directions whereby a loaded tray is elevated into the former position of the retracted tray and the other column descends to make room for the retracted tray, and coordinated means for moving a tray from the bottom of said other column beneath said one column.

BENJAMIN W. FRY.

No references cited.